(12) United States Patent
Yener

(10) Patent No.: US 8,173,099 B2
(45) Date of Patent: May 8, 2012

(54) METHOD OF FORMING A POROUS ALUMINOUS MATERIAL

(75) Inventor: Doruk O. Yener, Wilmington, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 391 days.

(21) Appl. No.: 12/337,539

(22) Filed: Dec. 17, 2008

(65) Prior Publication Data

US 2009/0163362 A1 Jun. 25, 2009

Related U.S. Application Data

(60) Provisional application No. 61/015,065, filed on Dec. 19, 2007.

(51) Int. Cl.
 *C01F 7/02* (2006.01)
(52) U.S. Cl. ............... 423/625; 423/628; 428/312.8; 502/439
(58) Field of Classification Search .............. 423/111, 423/115, 119, 121–130, 324–325, 327.1, 423/624–625, 628, 630; 502/100, 102, 103, 502/104, 107, 113, 150, 158, 237, 238, 240, 502/351, 400, 415, 439; 264/413, 414, 681, 264/340; 428/312.2–312.8
See application file for complete search history.

(56) References Cited

U.S. PATENT DOCUMENTS

| | | |
|---|---|---|
| 2,763,620 A | 9/1956 | Bugosh |
| 2,915,475 A | 12/1959 | Bugosh |
| 3,056,747 A | 10/1962 | Arthur, Jr. |
| 3,108,888 A | 10/1963 | Bugosh |
| 3,117,944 A | 1/1964 | Harrell |
| 3,136,644 A | 6/1964 | Pangonis |
| 3,202,626 A | 8/1965 | FitzSimmons |
| 3,321,272 A | 5/1967 | Kerr |
| 3,357,791 A | 12/1967 | Napier |
| 3,385,663 A | 5/1968 | Hughes |
| 3,387,447 A | 6/1968 | Trammell et al. |
| 3,790,495 A | 2/1974 | Podschus |
| 3,814,782 A | 6/1974 | Hayes et al. |
| 3,842,111 A | 10/1974 | Meyer-Simon et al. |
| 3,853,688 A | 12/1974 | D'Ambrosio |
| 3,865,917 A | 2/1975 | Galasso et al. |
| 3,873,489 A | 3/1975 | Thurn et al. |
| 3,950,180 A | 4/1976 | Kato |

(Continued)

FOREIGN PATENT DOCUMENTS

CN 1237146 A 12/1999

(Continued)

OTHER PUBLICATIONS

Yueng et al, Mesoporous alumina membranes: Synthesis, characterization, thermal stability and nonuniform distribution of catalyst, 1997, Journal of Membrane Science, 131, pp. 9-28.*

(Continued)

*Primary Examiner* — Steven Bos
*Assistant Examiner* — Justin Bova
(74) *Attorney, Agent, or Firm* — Abel Law Group, LLP

(57) ABSTRACT

An aggregate material includes an aluminous material and a toughening agent in contact with the aluminous material. The aluminous material has a primary aspect ratio of at least about 1.5 and a particle size between about 30 nm and about 1000 nm.

18 Claims, 2 Drawing Sheets

U.S. PATENT DOCUMENTS

| | | | |
|---|---|---|---|
| 3,978,103 A | 8/1976 | Meyer-Simon et al. |
| 3,997,581 A | 12/1976 | Pletka et al. |
| 4,002,594 A | 1/1977 | Fetterman |
| 4,105,465 A | 8/1978 | Berger |
| 4,117,105 A | 9/1978 | Hertzenberg et al. |
| 4,120,943 A | 10/1978 | Iwaisako et al. |
| 4,344,928 A | 8/1982 | Dupin et al. |
| 4,377,418 A | 3/1983 | Birchall et al. |
| 4,386,185 A | 5/1983 | Macdonell et al. |
| 4,492,682 A | 1/1985 | Trebillion |
| 4,525,494 A | 6/1985 | Andy |
| 4,539,365 A | 9/1985 | Rhee |
| 4,558,102 A | 12/1985 | Miyata |
| 4,623,738 A | 11/1986 | Sugerman et al. |
| 4,632,364 A | 12/1986 | Smith |
| 4,716,029 A | 12/1987 | Oguri et al. |
| 4,769,179 A | 9/1988 | Kato et al. |
| 4,797,139 A * | 1/1989 | Bauer ............................... 51/293 |
| 4,835,124 A | 5/1989 | Pearson |
| 4,891,127 A | 1/1990 | Murrel et al. |
| 4,946,666 A | 8/1990 | Brown |
| 4,992,199 A | 2/1991 | Meyer et al. |
| 5,155,085 A | 10/1992 | Hamano et al. |
| 5,194,243 A | 3/1993 | Pearson et al. |
| 5,286,290 A | 2/1994 | Risley |
| 5,302,368 A | 4/1994 | Harato et al. |
| 5,306,680 A | 4/1994 | Fukuda |
| 5,318,628 A | 6/1994 | Matijevic et al. |
| 5,321,055 A | 6/1994 | Slocum |
| 5,332,777 A | 7/1994 | Goetz et al. |
| 5,344,489 A | 9/1994 | Matijevic et al. |
| 5,401,703 A | 3/1995 | Fukuda |
| 5,413,985 A | 5/1995 | Thome et al. |
| 5,445,807 A | 8/1995 | Pearson |
| 5,508,016 A | 4/1996 | Yamanishi et al. |
| 5,527,851 A | 6/1996 | Barron et al. |
| 5,550,180 A | 8/1996 | Elsik et al. |
| 5,580,914 A | 12/1996 | Falla et al. |
| 5,580,919 A | 12/1996 | Agostini et al. |
| 5,583,245 A | 12/1996 | Parker et al. |
| 5,663,396 A | 9/1997 | Musleve et al. |
| 5,684,171 A | 11/1997 | Wideman et al. |
| 5,684,172 A | 11/1997 | Wideman et al. |
| 5,696,197 A | 12/1997 | Smith et al. |
| 5,707,716 A | 1/1998 | Yoshino et al. |
| 5,723,529 A | 3/1998 | Bernard et al. |
| 5,785,722 A | 7/1998 | Garg et al. |
| 5,849,827 A | 12/1998 | Boediger et al. |
| 5,900,449 A | 5/1999 | Custodero et al. |
| 5,955,142 A | 9/1999 | Yoshino et al. |
| 5,962,124 A | 10/1999 | Yoshino et al. |
| 5,989,515 A | 11/1999 | Watanabe et al. |
| 6,017,632 A | 1/2000 | Pinnavaia et al. |
| 6,143,816 A | 11/2000 | Prescher et al. |
| 6,156,835 A | 12/2000 | Anderson et al. |
| 6,203,695 B1 | 3/2001 | Harle et al. |
| 6,280,839 B1 | 8/2001 | Brown et al. |
| 6,403,007 B1 | 6/2002 | Kido et al. |
| 6,413,308 B1 | 7/2002 | Xu et al. |
| 6,417,286 B1 | 7/2002 | Agostini et al. |
| 6,440,187 B1 | 8/2002 | Kasai et al. |
| 6,440,552 B1 | 8/2002 | Kazuhara et al. |
| 6,485,656 B1 | 11/2002 | Meyer et al. |
| 6,486,254 B1 | 11/2002 | Barbee et al. |
| 6,506,358 B1 | 1/2003 | Stamires et al. |
| 6,534,584 B2 | 3/2003 | Wideman et al. |
| 6,555,496 B1 | 4/2003 | Stamires et al. |
| 6,576,324 B2 | 6/2003 | Yoshino et al. |
| 6,610,261 B1 | 8/2003 | Custodero et al. |
| 6,635,700 B2 | 10/2003 | Cruse et al. |
| 6,646,026 B2 | 11/2003 | Fan et al. |
| 6,648,959 B1 | 11/2003 | Fischer et al. |
| 6,653,387 B2 | 11/2003 | Causa et al. |
| 6,689,432 B2 | 2/2004 | Kitamura et al. |
| 6,706,660 B2 | 3/2004 | Park |
| 6,747,087 B2 | 6/2004 | Custodero et al. |
| 6,841,207 B2 | 1/2005 | Burch et al. |
| 6,858,665 B2 | 2/2005 | Larson |
| 6,872,444 B2 | 3/2005 | McDonald et al. |
| 6,924,011 B2 | 8/2005 | Van Aert et al. |
| 7,056,585 B2 | 6/2006 | Mishima et al. |
| 7,189,775 B2 | 3/2007 | Tang et al. |
| 7,211,612 B2 | 5/2007 | Kikuchi et al. |
| 7,226,647 B2 | 6/2007 | Kasperchik et al. |
| 7,479,324 B2 | 1/2009 | Bianchi et al. |
| 7,531,161 B2 | 5/2009 | Tang et al. |
| 2002/0004549 A1 | 1/2002 | Custodero et al. |
| 2002/0169243 A1 | 11/2002 | Nippa |
| 2003/0095905 A1 | 5/2003 | Scharfe et al. |
| 2003/0185736 A1 * | 10/2003 | Hatanaka et al. ............. 423/263 |
| 2003/0185739 A1 | 10/2003 | Mangold et al. |
| 2003/0197300 A1 | 10/2003 | Tang et al. |
| 2003/0202923 A1 | 10/2003 | Custodero et al. |
| 2004/0030017 A1 | 2/2004 | Simonot et al. |
| 2004/0120904 A1 | 6/2004 | Lye et al. |
| 2004/0166324 A1 | 8/2004 | Mishima et al. |
| 2004/0265219 A1 | 12/2004 | Bauer et al. |
| 2005/0124745 A1 | 6/2005 | Bauer et al. |
| 2005/0227000 A1 | 10/2005 | Bauer et al. |
| 2005/0267238 A1 | 12/2005 | Mutin |
| 2006/0096891 A1 | 5/2006 | Stamires et al. |
| 2006/0104895 A1* | 5/2006 | Bauer et al. .................. 423/625 |
| 2006/0106129 A1 | 5/2006 | Gernon et al. |
| 2006/0148955 A1 | 7/2006 | Guiselin et al. |
| 2006/0154021 A1* | 7/2006 | Ohno et al. ................... 428/116 |
| 2007/0104952 A1 | 5/2007 | Bianchi et al. |
| 2007/0148083 A1 | 6/2007 | Tang et al. |
| 2008/0003131 A1 | 1/2008 | Bauer et al. |
| 2008/0031808 A1 | 2/2008 | Bauer et al. |

FOREIGN PATENT DOCUMENTS

| | | |
|---|---|---|
| CN | 1266020 A | 9/2000 |
| CS | 195426 | 5/1982 |
| DE | 956535 | 1/1957 |
| DE | 2163678 | 7/1973 |
| DE | 2408122 | 8/1974 |
| DE | 2952666 | 7/1980 |
| DE | 19931204 | 1/2001 |
| EP | 0038620 A2 | 10/1981 |
| EP | 0015196 | 4/1982 |
| EP | 0108968 A1 | 5/1984 |
| EP | 0 130 865 A2 | 1/1985 |
| EP | 0304721 A1 | 3/1989 |
| EP | 0563653 A1 | 10/1993 |
| EP | 0 597 738 A1 | 5/1994 |
| EP | 0667405 A1 | 8/1995 |
| EP | 0501227 B1 | 12/1995 |
| EP | 0735001 A2 | 10/1996 |
| EP | 0736392 A1 | 10/1996 |
| EP | 0885844 A1 | 12/1998 |
| EP | 0896021 A1 | 2/1999 |
| EP | 1225200 A2 | 7/2002 |
| EP | 1256599 A1 | 11/2002 |
| EP | 1323775 A1 | 7/2003 |
| EP | 0697432 B1 | 10/2003 |
| EP | 1000965 B1 | 10/2003 |
| EP | 0807603 B1 | 12/2003 |
| EP | 1112961 B1 | 9/2004 |
| FR | 2927267 A1 | 8/2009 |
| GB | 1022944 | 3/1966 |
| GB | 1189304 | 4/1970 |
| GB | 2248841 A | 4/1992 |
| HU | 26758 T | 9/1983 |
| JP | 45032530 | 10/1970 |
| JP | 55116622 A | 9/1980 |
| JP | 56009427 A | 1/1981 |
| JP | 58026029 A2 | 2/1983 |
| JP | 58185434 A | 10/1983 |
| JP | 59193949 | 11/1984 |
| JP | 60-046923 | 3/1985 |
| JP | 61-179264 A | 8/1986 |
| JP | H4-78586 A | 9/1986 |
| JP | 62-030133 A | 2/1987 |
| JP | 63147820 A2 | 6/1988 |
| JP | 63147821 A2 | 6/1988 |
| JP | S63-131321 A | 6/1988 |
| JP | 05279019 | 10/1993 |

| | | |
|---|---|---|
| JP | 6322243 | 11/1994 |
| JP | 07018174 | 1/1995 |
| JP | 9-99627 | 4/1997 |
| JP | 09208809 | 8/1997 |
| JP | 09511258 | 11/1997 |
| JP | H9-511258 | 11/1997 |
| JP | 2686833 B2 | 12/1997 |
| JP | 11-217215 A2 | 8/1999 |
| JP | 11-228131 A2 | 8/1999 |
| JP | 2000-86235 A | 3/2000 |
| JP | 2000239014 | 9/2000 |
| JP | 2001-079414 A2 | 3/2001 |
| JP | 2001058818 A | 3/2001 |
| JP | 2001-139326 A | 5/2001 |
| JP | 2001180930 | 7/2001 |
| JP | 20010207077 | 7/2001 |
| JP | 2001-240633 A | 9/2001 |
| JP | 2001261976 | 9/2001 |
| JP | 2001-303458 A | 10/2001 |
| JP | 2001-323188 A | 11/2001 |
| JP | 2003002642 | 1/2003 |
| JP | 2003-54941 | 2/2003 |
| JP | 2003054941 | 2/2003 |
| JP | 2003107206 | 4/2003 |
| JP | 2003238150 | 8/2003 |
| JP | 2003238826 A | 8/2003 |
| JP | 2003-275588 A2 | 9/2003 |
| JP | 2003-313027 A | 11/2003 |
| JP | 2004-001463 A | 1/2004 |
| JP | 200459643 A | 2/2004 |
| JP | 2004051390 A2 | 2/2004 |
| JP | 2004-122784 | 4/2004 |
| KR | 10-1999-0051408 | 1/2002 |
| RU | 2148567 C1 | 5/2000 |
| SU | 267064 A | 7/1970 |
| SU | 1444080 A1 | 12/1988 |
| WO | 9511270 | 4/1995 |
| WO | 9723566 | 7/1997 |
| WO | 9814426 | 4/1998 |
| WO | 9935089 A1 | 7/1999 |
| WO | 0188265 A2 | 11/2001 |
| WO | 03/11941 A2 | 2/2003 |
| WO | 03/11941 A3 | 2/2003 |
| WO | 03089508 A1 | 10/2003 |
| WO | 2004016630 A1 | 2/2004 |
| WO | 2004056915 A1 | 7/2004 |
| WO | 2004090023 A1 | 10/2004 |
| WO | 2005100244 A2 | 10/2005 |
| WO | 2005100491 A2 | 10/2005 |
| WO | 2006002993 A1 | 1/2006 |
| WO | 2006049863 A1 | 5/2006 |
| WO | 200660206 A1 | 6/2006 |
| WO | 200660468 A3 | 6/2006 |
| WO | 2007056404 A1 | 5/2007 |
| WO | 2009109722 A1 | 9/2009 |

OTHER PUBLICATIONS

Accuratus, Zirconium Oxide, Feb. 24, 2006, http://replay.waybackmachine.org/20060224140049/www.accuratus.com/zirc.html.*

Thomas J. Martin, Sasol Presentation given on—Functionalized Aluminas, NABALTECH, web page: http://www.nabaltec.de/seiten_d/boehmit_d/anwendungen/news_05_08_98.htm.

Zhu, H. Y., et al., "Growth of Boehmite Nanofibers by Assembling Nanoparticles with Surfactant Micelles", J. Phys. Chem. B., vol. 108, pp. 4245-4247, 2004.

Fisch, H., et al., "Hybrid Materials Based on Polymer Matrices & Organic Components", NTIS, Germany 1994.

Buining et al., J. Am. Ceram. Soc. vol. 74 [6], pp. 1303-1307.

Anonymous: "High Purity Dispersible Aluminas"; URL:http://www.sasol.com/sasol_internet/downloads/DISPERAL-DISPAL_1055338543391.pdf>abstract; tables 1,2.

Boccaccini A. R. et al; "Alumina Ceramics Based on Seeded Boehmite and Electrophoretic Deposition"; Ceramics International; Elsevier; Amsterdam, NL; vol. 28, No. 8; 2002; pp. 893-897.

Grant et al., "Grant and Hackh's Chemical Dictionary", 5th Ed., (1987), McGraw-Hill Book. Co. USA, ISBN 0-07-024067-1, p. 160.

Zhang, L. et al., "Preparation and Characterization of Nano-fibrous g-Al2O3," Shiyou Huagong, vol. 33, No. 3, pp. 240-243, 2004.

Zhu, H. et al., "Novel Synthesis of Alumina Oxide Nanofibers," Materials Research Society Symposium Proceedings, vol. 703, pp. 25-30, 2002.

Zhu, H., et al., "g-Alumina Nanofibers Prepared From Aluminum Hydrate with Poly(ethylene oxide) Surfactant," Chemistry of Materials, vol. 14, No. 5, pp. 2086-2093, 2002.

Wakayama, H., et al., "Nanoporous Metal Oxides Xynthesized by the Nanoscale Casting Process Using Supercritical Fluids," Chemistry of Materials, vol. 13, No. 7, pp. 2392-2396, 2001.

Yu, Z. et al., "Preparation of Nanometer-sized Alumina Whiskers," Journal of Materails Research, vol. 13, No. 11, pp. 3017-3018, 1998.

Kimura, Y., et al., "Synthesis of poly[(acyloxy)aloxane] with carboxyl ligand and its utilization for hte processing of alumina fiber," vol. 20, No. 10, pp. 2329-2334, 1987.

Podergin, V., et al., "Electron-microscopic study of whiskers formed during pentoxide reduction by alunium," Metalloterm, Protsessy Khim. Met., pp. 44-50, 1972.

Park, B., et al., "Preparation of High-Capacity Ceramic Catalytic Support from Gibbsite," Han'Guk Seramik Hakhoechi, vol. 39, No. 3, pp. 245-251, 2002.

Brusasco R., et al., "Preparation and Characterization of Fibrillar Boehmite and g-Aluminum Oxide," Materials Research Bulletin, vol. 19, No. 11, pp. 1489-1496, 1984.

Kuang, X., et al., "Preparation of Special-shaped g-AlOOH g-Al2O3 Ultrafine Powders by Hydrothermal Reaction Method," Materials and Components for Engines, pp. 594-597, 1994.

Liu, S., et al., "Synthesis of Novel Nanostructured g-Al2O3 by Pyrolysis of Aluminumoxyhdride-HAlO," Journal of Materials Chemistry, vol. 13, No. 12, pp. 3107-3111, 2003.

Hicks, R., et al., "Nanoparticle Assembly of Mesoporous AlOOH (Boehmite)," Chemistry of Materials, vol. 15, No. 1, pp. 78-82, 2003.

Ozuna, O., et al., "Pressure Influenced Combustion Synthesis of Gamma- and Alpha-Al2O3 Nanocrystalline," Journal of Physics-Condensed Matter, vol. 16, No. 15, pp. 2585-2591, 2004.

McHale, J. et al., "Effects of Increased Surface Area and Chemisorbed H2O on hte Relative Stability of Nanocrystalline Gamma-Al2O3 and Al2O3," Journal of Physical Chemistry, vol. 101, No. 4, pp. 603-613, 1997.

Kuang, D., et al., "Fabrication of Boehmite Aiooh and Gamma-Al2O3 Nanotubes via a Soft Solution Route," Journal of Materials Chemistry, vol. 13, No. 4, pp. 660-662, 2003.

Tijburg, I., et al., "Sintering of Pseudo-Boehmite and Gamma-Al2O3," Journal of Materials Science, vol. 26, No. 21, pp. 5945-5949, 1991.

Wei, Z. et al., "Research for Separation of Precursor in the Preparation Process of Gamma-Al2O3 Ultrafine Powder via Precipitation," Journal of Basic Science and Engineering, vol. 12, pp. 19-23, 2004.

Singhal, A., "Aluminum Speciation in Aqueous Solutions and Its Effect on Properties of Chemically Synthesized Alumina Powders (Ceramics)," Dissertation Abstracts International, vol. 55, No. 04-B, 1994.

Kim, S., et al., "Preparation of High-Temperature Catalytic Support from Gabbsite II. Properties of Amorphous Alumina as Precursor of Catalyst Support," Journal of the Korean Ceramic Society, vol. 33, No. 1, pp. 92-100, 1996.

Zhang, Z., et al., "Mesostructured Forms of Gamma-A(sub2)O(sub 3)," J. Am. Chemc. Soc., Vo. 124, No. 8, p. 15, ISSN/ISBN: 00027863.

Llusar, M. et al., "Templated growth of Alumina-based Fibers Through the Use of Anthracenic Organogelators," Chemistry of Materials, vol. 14, No. 12, pp. 5124-5133, 2002.

Strek, W., et al., "Preparation and Emission Spectra of Eu(III) in Nanostrcutred Gamma-Alumina," Spectrochimica Acta, Part A, vol. 54A, No. 13, pp. 2121-2124, 1997.

Yogo, T., et al., "Synthesis of Polycrystalline Alumina Fibre with Aluminium Chelate Precursor," Journal of Materials Science, vol. 26, No. 19, pp. 5292-5296, 1999.

Saraswati, V., et al., "X-ray Diffraction in Gamma-alumina Whiskers," Journal of Crystal Growth, vol. 83, No. 4, pp. 606-609, 1987.

Zhu, H., et al., "Growth of Boehmite Nanoribers by Assembling Nanoparticles with Surfactant Micelles," Journal of Physical Chemistry, vol. 108, No. 14, pp. 4245-4247, 2006.

Kamiya, K. et al., "Crystallization Behavior of Sol-Gel-Derived Alumina Fibers. Formation of .Alpha.-alumina Around 500.DEG.C.," Jinko Kessho Toronkai Koen Yoshishu, vol. 41, pp. 9-10, 1996.

Iucuta, P., et al., "Phase Evolution in Al2O3 Fibre Prepared From an Oxychloride Precursor," Journal of Materials Science, vol. 27, No. 22, pp. 6053-6061, 1992.

Cuneyt Tas, A., "Chemical Preparation of the Binary Compounds in the Calcia-Alumina Systems by Self-Propagating Combustion Synthesis," J. Am. Ceram. Soc., vol. 81, No. 11, pp. 2853-2863, 1998.

Tsai, D., et al., "Controlled Gelation and Sintering of Monolithic Gels Prepared from gamma-Alumina Fume Powder," J. Am. Ceram. Soc., vol. 74, No. 4, pp. 830-836, 1991.

Alexander, K. et al., "Grain Growth Kinetics in Alumina-Zirconia (CeZTA) Composites," J. Am. Ceram. Soc., vol. 77, No. 4, pp. 939-946, 1994.

Okada, K. et al., "Effect of Divalent Cation Additives on the gamma-Al2O3-to-Al2O3 Phase Transition," J. Am. Ceram. Soc., vol. 83, No. 4, pp. 928-932, 2000.

"Halogenated Polyolefin," Thermoplastc Elastomers Properties and Applications, Rapra Review Reports, vol. 7, pp. 17-18, 1995.

Brusasco, Raymond, M. "Preparation and Characterization of Acicular Particles and Thin Films of Aluminum Oxide," Thesis Brown University, May 1987, 107 pgs.

Schaber, Peter, M. et al., "Study of the Urea Thermal Decomposition (Pyrolysis) Reacation and Imporatnce to Cyanuric Acid Production," American Laboratory, Aug. 1999, pp. 13-21.

U.S. Appl. No. 10/414,590, filed Apr. 16, 2003, Inventors: Ralph Bauer et al.

U.S. Appl. No. 11/685,000, filed Mar. 12, 2007, Inventors: Ralph Bauer et al.

U.S. Appl. No. 10/823,400, filed Apr. 13, 2004, Inventors: Ralph Bauer et al.

U.S. Appl. No. 10/978,286, filed Oct. 29, 2004, Inventors: Ralph Bauer et al.

U.S. Appl. No. 12/399,751, filed Mar. 6, 2009, Inventors: Ralph Bauer et al.

U.S. Appl. No. 10/845,764, filed May 14, 2004, Inventors: Ralph Bauer et al.

U.S. Appl. No. 11/834,527, filed Aug. 6, 2007, Inventors: Ralph Bauer et al.

U.S. Appl. No. 10/992,477, filed Nov. 18, 2004, Inventors: Ralph Bauer et al.

U.S. Appl. No. 11/754,889, filed May 29, 2007, Inventors: Ralph Bauer et al.

U.S. Appl. No. 11/269,508, filed Nov. 8, 2005, Inventors: Catherine Bianchi et al.

U.S. Appl. No. 12/336,398, filed Dec. 16, 2008, Inventors: Catherine Bianchi et al.

U.S. Appl. No. 11/288,945, filed Nov. 29, 2005, Inventors: Olivier Guiselin et al.

U.S. Appl. No. 12/636,022, filed Dec. 11, 2009, Inventors: Doruk Yener.

L.A. Blank et al., "Modification of fillers for Ftorlon-4 with microfibrous boehmite", Sov. Plast., 1972, 2, 66-67.

Paul A. Buining et al., "Preparation on (non-)aqueous dispersions of colloidal boehmite needles", Chemical Engineering Science, 48(2), 411-417, 1993.

Johann Buitenhuis et al., "Phase separation of mixtures of colloidal boehmite rods and flexible polymer," Journal of Colloid and Interface Science, 1995, 175, 46-56.

V.G. Fitzsimmons, W.A. Zisman, "Microfiber reinforcement of polytetrafluoroethylene", Modern Plastics, 1963, 40 (5), 151-154, 158, 160-162, 238-241.

John Bugosh et al., "A Novel fine alumina powder, fibrillar boehmite", I&EC Product Research and Development, vol. 1, No. 3, Sep. 1962.

P.A. Buining et al., "Preparation and properties of dispersions of colloidal boehmite rods", Progr Colloid Polym Sci 93:10-11 (1993).

Sridhar Komarneni, "Nanocomposites", J. Mater. Chem., 1992, 2(12), 1219-1230.

S. Furuta et al., "Preparation and properties of fibrous boehmite sol and its application for thin porous membrane", Journal of Materials Science Letters 13 (1994) 1077-1080.

B.S. Gevert and Zhong-Shu Ying, "Formation of fibrillar boehmite", Journal of Porous Materials, 6, 63-67 (1999).

M.P.B. Van Bruggen, "Preparation and properties of colloidal core-shell rods with adjustable aspect ratios", Langmuir 1998, 14, 2245-2255.

John Bugosh, "Colloidal alumina—the chemistry and morphology of colloidal boehmite", J. Phys. Chem., 1961, 65 (10), pp. 1789-1793.

Paul A. Buining et al., "Effect of hydrothermal conditions on the morphology of colloidal boehmite particles: Implications for fibril formation and monodispersity", J. Am. Ceram. Soc., 1990, 73[8] 2385-90.

* cited by examiner

METHOD OF FORMING A POROUS ALUMINOUS MATERIAL

CROSS-REFERENCE TO RELATED APPLICATION(S)

The present application claims priority from U.S. Provisional Patent Application No. 61/015,065, filed Dec. 19, 2007, entitled "Aggregates of Alumina Hydrates," naming inventor Doruk O. Yener, which application is incorporated by reference herein in its entirety.

FIELD OF THE DISCLOSURE

This disclosure, in general, relates to aggregates of alumina hydrates.

BACKGROUND

With increasing worldwide demand for consumer products, demand has increased for the chemicals used in manufacturing processes for such consumer products. Such chemicals are often derived from petroleum or agriculture resources through catalyzed reactions. As such, demand for catalyst remains high.

Catalysts are used in a variety of applications, ranging from the synthesis of desirable products to the removal of pollutants from waste streams. While catalysts may mix homogenously with reactants, often catalysts are solid or are formed on a solid support. Typically, a sold catalytic agent is coated onto a catalyst support to increase the surface area of the catalytic agent available for contact with the reactants, which are typically in a liquid or gaseous form. Determining an appropriate material for the catalyst support leads to consideration of several properties, such as specific surface area, pore size, pore volume, and physical, chemical, and thermal durability.

Traditional support materials often exhibit a trade off between porosity and mechanical strength. Higher porosity materials typically have poor mechanical properties, such as compression strength, while lower porosity materials generally have reasonable mechanical properties. As such, catalyst support materials with improved mechanical properties and strength are desired.

SUMMARY

In a particular embodiment, an aggregate material includes an aluminous material and a toughening agent in contact with the aluminous material. The aluminous material has a primary aspect ratio of at least about 1.5 and a particle size between about 30 nm and about 1000 nm.

In another exemplary embodiment, an aggregate material includes an aluminous material and a pore modifying agent in contact with the aluminous material. The aluminous material has a primary aspect ratio of at least about 1.5 and a particle size between about 30 nm and about 1000 nm.

In a further embodiment, a method of forming a porous aluminous material includes combining an aluminous sol and an additive to form an aggregate material. The aluminous sol includes particulate material having a primary aspect ratio of at least about 1.5 and a particle size between about 30 nm and about 1000 nm. The method further includes drying the aggregate material to form a porous aluminous material and heat treating the porous aluminous material.

In yet another exemplary embodiment, an aggregate material includes an aluminous material and a pinning agent in contact with the aluminous material. The aluminous material includes particles having a primary aspect ratio of at least about 1.5 and a particle size between about 30 nm and about 1000 nm.

In a further exemplary embodiment, a method of forming a porous aluminous material includes mixing an aluminous sol and a toughening agent to form an aggregate material. The aluminous sol includes aluminous particles having a primary aspect ratio of at least about 3.0 and a particle size between about 30 nm and about 1000 nm. The method further includes heat treating the aggregate material to form a porous aluminous material.

In a further exemplary embodiment, a method of forming a porous aluminous material includes mixing an aluminous sol and a pore modifying agent to form an aggregate material. The aluminous sol includes aluminous particles having a primary aspect ratio of at least about 3.0 and a particle size between about 30 nm and about 1000 nm. The method further includes heat treating the aggregate material to form a porous aluminous material. At least a portion of the pore modifying agent is removed during heat treating.

In a further exemplary embodiment, a method of forming a porous aluminous material includes mixing an aluminous sol and a pinning agent to form an aggregate material. The aluminous sol includes aluminous particles having a primary aspect ratio of at least about 3.0 and a particle size between about 30 nm and about 1000 nm. The method further includes heat treating the aggregate material to form a porous aluminous material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
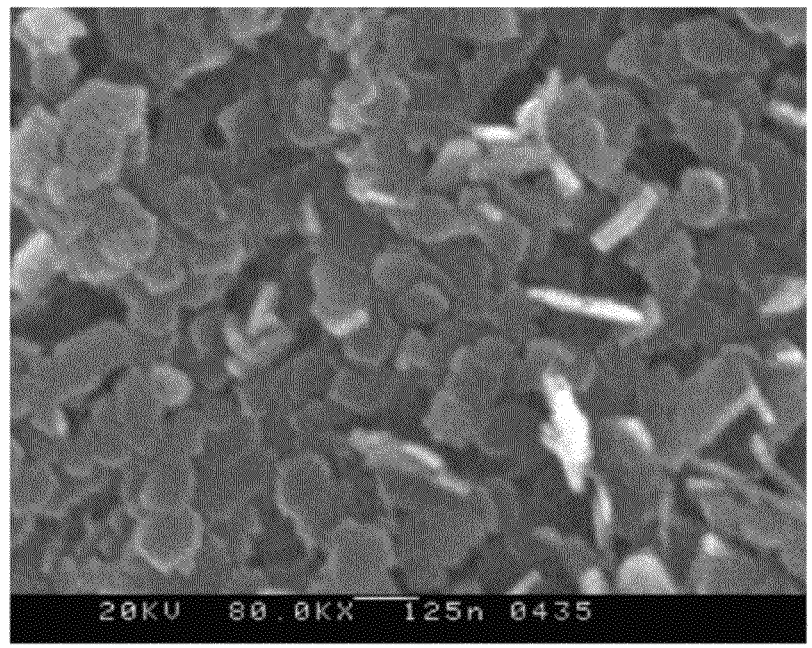
FIG. 1 is an illustrative image of exemplary platelet shaped particles.

In a particular embodiment, an aggregate material includes an aluminous material and an additive in contact with the aluminous material. The aluminous material may have a primary aspect ratio of at least about 1.5 and may have a particle size between about 30 nm and about 1000 nm. In an example, the additive may be a toughening agent, such as a multivalent cation. In another example, the additive may be a pore modifying agent, such as an organic material or coated organic material. In yet another example, the additive may be a pinning agent.

In a further embodiment, a method of forming a porous aluminous material includes combining an aluminous sol and an additive. The additive may be a pore modifying agent, a pinning agent, a toughening agent, or any combination thereof. The pore modifying agent may have a coating. The aluminous material has a primary aspect ratio of at least about 1.5 and a particle size between about 30 nm and about 1000 nm. The method further includes drying the aluminous sol to form a porous aluminous material and heat treating the porous aluminous material. During heat treating, at least a portion of the pore modifying agent may be removed.

In general, an aggregate material is formed from an aluminous sol in which an additive is dispersed. The aluminous sol is dried and heat treated to form the aggregate material.

As used herein, an aluminous material may include and be formed from alumina particulate, such as alumina hydrate particles or particles of other forms of alumina. Further, the aluminous material may include aggregated material formed of the alumina particulate. In a particular embodiment, the alumina particulate and thus, any aggregated material formed from such alumina particulate may be formed via a seeded process that imparts specific properties to the final aluminous material.

In the context of one aluminous seeded material example, processing begins with provision of a solid particulate boehmite precursor and boehmite seeds in a suspension, and heat treating (such as by hydrothermal treatment) the suspension (alternatively sol or slurry) to convert the boehmite precursor into boehmite particulate material formed of particles or crystallites. While certain embodiments make use of the as-formed hydrothermally-treated product for use as a catalyst support, other embodiments utilize heat treatment to effect polymorphic transformation into alumina, particularly transitional alumina. According to one aspect, the particulate material (including boehmite and transitional alumina) has a relatively elongated morphology. In addition, the morphological features associated with the boehmite may be preserved in the transitional alumina particulate material.

The term "boehmite" is generally used herein to denote alumina hydrates including mineral boehmite, typically being $Al_2O_3 \cdot H_2O$ and having a water content on the order of 15%, as well as psuedoboehmite, having a water content higher than 15%, such as 20-38% by weight. It is noted that boehmite (including psuedoboehmite) has a particular and identifiable crystal structure, and accordingly unique X-ray diffraction pattern, and as such, is distinguished from other aluminous materials including other hydrated aluminas, such as ATH (aluminum trihydroxide), a common precursor material used herein for the fabrication of boehmite particulate materials.

Turning to the details of the processes by which the seeded aluminous particulate material may be manufactured, typically an aluminous material precursor including bauxitic minerals, such as gibbsite and bayerite, are subjected to hydrothermal treatment as generally described in the commonly owned U.S. Pat. No. 4,797,139. More specifically, the particulate material may be formed by combining the precursor and seeds (having desired crystal phase and composition, such as boehmite seeds) in suspension, exposing the suspension (alternatively sol or slurry) to heat treatment to cause conversion of the raw material into the composition of the seeds (in this case boehmite). The seeds provide a template for crystal conversion and growth of the precursor. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns, preferably less than 100 nm, and even more preferably less than 10 nm. In the case the seeds are agglomerated, the seed particles size refers to seed primary particles size. Generally, the seed particles are present in an amount greater than about 1% by weight of the boehmite total precursor material (precursor material and seed material), typically at least 2% by weight, such as 2 to 40% by weight, more typically 5 to 15% by weight (calculated as $Al_2O_3$). Total precursor material is typically loaded at a percent solids content of 10% to 50%, preferably 15% to 30%. Heating is carried out at a temperature greater than about 120° C., such as greater than about 100° C., or even greater than about 120° C., such as greater than about 130° C. In one embodiment, the processing temperature is greater than 150° C. Usually, the processing temperature is below about 300° C., such as less than about 250° C. Processing is generally carried out in the autoclave at an elevated pressure such as within a range of about $1\times10^5$ newtons/m$^2$ to about $8.5\times10^6$ newtons/m$^2$. In one example, the pressure is autogenously generated, typically around $2\times10^5$ newtons/m$^2$.

In the case of relatively impure precursor material, such as bauxite, generally the material is washed, such as rinsing with de-ionized water, to flush away impurities such as silicon and titanium hydroxides and other residual impurities remaining from the mining processes to source bauxite.

The particulate aluminous material may be fabricated with extended hydrothermal conditions combined with relatively low seeding levels and acidic pH, resulting in preferential growth of boehmite along one axis or two axes. Longer hydrothermal treatment may be used to produce even longer and higher aspect ratio of the boehmite particles or larger particles in general. Time periods typically range from about 1 to 24 hours, preferably 1 to 3 hours.

Several variables may be modified during the processing of the particulate material to affect the desired morphology. These variables notably include the weight ratio, that is, the ratio of precursor (i.e., feed stock material) to seed, the particular type or species of acid or base used during processing (as well as the relative pH level), and the temperature (which is directly proportional to pressure in an autogenous hydrothermal environment) of the system.

In particular, when the weight ratio is modified while holding the other variables constant, the shape and size of the particles forming the boehmite particulate material are modified. For example, when processing is carried at 180° C. for two hours in a 2 weight % nitric acid solution, a 90:10 ATH: boehmite ratio (precursor:seed ratio) forms needle-shaped particles (ATH being a species of boehmite precursor). In contrast, when the ATH:boehmite seed ratio is reduced to a value of 80:20, the particles become more elliptically shaped. Still further, when the ratio is further reduced to 60:40, the particles become near-spherical. Accordingly, most typically the ratio of boehmite precursor to boehmite seeds is not less than about 60:40, such as not less than about 70:30 or 80:20. However, to ensure adequate seeding levels to promote the fine particulate morphology that is desired, the weight ratio of boehmite precursor to boehmite seeds is generally not greater than about 98:2. Based on the foregoing, an increase in weight ratio generally increases aspect ratio, while a decrease in weight ratio generally decreases aspect ratio.

Further, when the type of acid or base is modified, holding the other variables constant, the shape (e.g., aspect ratio) and size of the particles are affected. For example, when processing is carried out at 180° C. for two hours with an ATH: boehmite seed ratio of 90:10 in a 2 weight % nitric acid solution, the synthesized particles are generally needle-shaped. In contrast, when the acid is substituted with HCl at a content of 1 weight % or less, the synthesized particles are generally near spherical. When 2 weight % or higher of HCl is utilized, the synthesized particles become generally needle-shaped. At 1 weight % formic acid, the synthesized particles are platelet-shaped. Further, with use of a basic solution, such as 1 weight % KOH, the synthesized particles are platelet-shaped. When a mixture of acids and bases is utilized, such as 1 weight % KOH and 0.7 weight % nitric acid, the morphology of the synthesized particles is platelet-shaped. Noteworthy, the above weight % values of the acids and bases are based on the solids content only of the respective solid suspensions or slurries, that is, are not based on the total weight % of the total weight of the slurries.

Suitable acids and bases include mineral acids such as nitric acid, organic acids such as formic acid, halogen acids such as hydrochloric acid, and acidic salts such as aluminum nitrate and magnesium sulfate. Effective bases include, for example, amines including ammonia, alkali hydroxides such as potassium hydroxide, alkaline hydroxides such as calcium hydroxide, and basic salts.

Still further, when temperature is modified while holding other variables constant, typically changes are manifested in particle size. For example, when processing is carried out at an ATH:boehmite seed ratio of 90:10 in a 2 weight % nitric acid solution at 150° C. for two hours, the crystalline size from x-ray diffraction characterization was found to be 115 Angstroms. However, at 160° C. the average particle size was found to be 143 Angstroms. Accordingly, as temperature is increased, particle size is also increased, representing a directly proportional relationship between particle size and temperature.

In an exemplary embodiment, dopants and additives can be combined with the boehmite feedstock material at various points in the processing prior to calcination. The dopants and additives notably include pinning agents, toughening agents, or pore modifiers.

In particular, a pinning agent may be added to the boehmite feedstock during the initial heat treatment and crystalline conversion, during an agglomeration treatment, or just prior to removal of the liquid content. Typically, during calcination, as the boehmite feedstock is converted to transitional alumina, pore volume is reduced. Addition of a pinning agent limits the grain size of the transitional alumina and maintains the pore volume during calcination, resulting in transitional alumina material with increased pore volumes compared with transitional alumina formed without the use of a pinning agent. Typical pinning agents include $ZrO_2$, $TiO_2$, CaO, CoO, NiO, ZnO, MnO, CuO, SrO, BaO, SiC, or any combination thereof. When using a pinning agent such as SiC, the calcinations is typically carried out in an inert atmosphere, such as a $N_2$ atmosphere. Alternatively, calcinations can be carried out in an ambient atmosphere for pinning agents other than SiC. In an example, the pinning agent may be added to an alumina:pinning agent ratio of at least about 60:40, preferably a ratio of at least about 75:25, such as a ratio of at least about 90:10.

In another example, a toughening agent may be added to the boehmite feedstock during the initial heat treatment and crystalline conversion, during an agglomeration treatment, or just prior to removal of the liquid content. Toughening agents typically include multivalent cations and oxides of such multivalent cations. An example of a multivalent cation used as a toughening agent may be derived from atoms such as Si, Mg, La, Ba, Zr, Al, Ti or any combination thereof. For example, the multivalent cation may be $Si^{4+}$, $Mg^{2+}$, $La^{3+}$, $Ba^{2+}$, $Zr^{4+}$, $Al^{3+}$, $Ti^{4+}$, or any combination thereof. Toughening agents act to increase the strength, such as crush strength, of the aluminous material after calcination. In an example, the toughening agent may be added to an alumina:toughening agent ratio of at least about 60:40, preferably a ratio of at least about 75:25, such as a ratio of at least about 90:10.

In an exemplary embodiment, pore modifiers can be added to the boehmite feedstock prior to removal of the liquid content. Typically, pore modifiers are organic based materials that burn out during heat treatment or calination, leaving pores of defined size. Pore modifiers can include walnut shell, polymer beads, hydroxyl ethyl cellulose, PEG, ammonium carbonate, or any combination thereof. Additionally, pore modifiers may be coated with toughening agents or pinning agents that remain in the pore after the pore modifier is removed. For example, a polymer bead may be coated with $TiO_2$, $SiO_2$, SiC, $ZrO_2$, yttria stabilized zirconia (YSZ), or any combination thereof. After burnout of the polymer bead, the coating remains forming a glassy or transition phase with the alumina on the inner surface of the pore, enhancing the strength of the porous structure. In a particular embodiment, the glassy or transition phase is discontinuous, such as only covering a portion of the surface interior to the material. For example, the discontinous phase may cover not greater than about 50%, such as not greater than about 25%, or even not greater than 15% of the interior surface of the aggregated alumina particulate. In an example, the pore modifier may be added to an alumina:pore modifier ratio of at least about 60:40, preferably a ratio of at least about 75:25, such as a ratio of at least about 90:10.

Additionally, surface modifiers combined with the boehmite feedstock alter the surface chemistry of the boehmite or transitional alumina. Cations, such as Na, K, Mg, and Ca, and anions, such as Cl and P, can affect the surface acidity of the aluminous material. These surface modifiers can be added during the initial heat treatment and crystalline conversion, during an agglomeration treatment, or just prior to removal of the liquid content. Alternatively, impurities that act as surface modifiers can be removed prior to drying and calcinations though ion exchange.

Following heat treatment and crystalline conversion, the liquid content is generally removed. In an example, the process to remove liquid may limit agglomeration of the particles of boehmite upon elimination of water, such as freeze drying, spray drying, or other techniques to prevent excess agglomeration. In certain circumstances, ultrafiltration processing or heat treatment to remove the water might be used. Thereafter, the resulting mass may be crushed, such as to 100 mesh, if desired. It is noted that the particulate size described herein generally describes the single crystallites formed through processing, rather than any aggregates that may remain in certain embodiments.

Alternatively, the mixture may be treated to encourage agglomeration prior to removing water. For example, the pH of the mixture may be adjusted. In particular, adjusting the pH close to the isoelectric point of the alumina hydrate particulate may encourage agglomeration of the particles. The mixture may be dried as above, or through pan drying.

As noted above, the as-formed hydrothermally processed particulate material may be used in certain embodiments, while in other embodiments, processing may continue to form a converted aluminous material. In this case, the hydrothermally processed particulate material forms the feedstock material that may be further heat treated. In the case of boehmite particulate material from hydrothermal processing, further thermal treatment causes conversion to transitional alumina. Here, the boehmite feedstock material is heat treated by calcination at a temperature sufficient to cause transformation into a transitional phase alumina, or a combination of transitional phases. Typically, calcination or heat treatment is carried out at a temperature greater than about 250° C., such as greater than about 500° C. At temperatures less than 250° C., transformation into the lowest temperature form of transitional alumina, gamma alumina, typically will not take place. At temperatures greater than 1100° C., typically the precursor will transform into the alpha phase. According to certain embodiments, calcination is carried out at a temperature greater than 500° C., such as not less than about 800° C. In particular, the calcination temperature may be as high as 1250° C. or higher.

Other embodiments are calcined at a temperature lower than 950° C., such as within a range of 750° C. to 950° C. to form a substantial content of delta alumina. According to particular embodiments, calcination is carried out at a temperature less than about 800° C., such as less than about 775° C. or 750° C. to effect transformation into a predominant gamma phase.

Calcination may be carried out in various environments including controlled gas and pressure environments. Because calcination is generally carried out to effect phase changes in the precursor material and not chemical reaction, and since the resulting material is predominantly an oxide, specialized gaseous and pressure environments need not be implemented except for most desired transitional alumina end products. However, when oxidizable additives, such as SiC, are combined with the alumina hydrate particulates, calcination may be carried out in an inert gas atmosphere to prevent oxidation of the additive.

Typically, calcination is carried out for a controlled time period to effect repeatable and reliable transformation from batch to batch. Here, most typically shock calcination is not carried out, as it is difficult to control temperature and hence control phase distribution. Accordingly, calcination times typically range from about 0.5 minutes to 60 minutes, typically, 1 minute to 15 minutes.

Generally, as a result of calcination, the particulate material is mainly (more than 50 wt %) transitional alumina. More typically, the transformed particulate material was found to contain at least 70 wt %, typically at least 80 wt %, such as at least 90 wt % transitional alumina. The exact makeup of transitional alumina phases may vary according to different embodiments, such as a blend of transitional phases, or essentially a single phase of a transitional alumina (e.g., at least 95 wt %, 98 wt %, or even up to 100 wt % of a single phase of a transitional alumina).

According to one particular feature, the morphology of the boehmite feedstock material is largely maintained in the final, as-formed transitional alumina. Accordingly, desirable morphological features may be engineered into the boehmite according to the foregoing teaching, and those features preserved. For example, embodiments have been shown to retain at least the specific surface area of the feedstock material, and in some cases, increase surface area by amount of at least 8%, 10%, 12%, 14% or more.

In the context of seeded aluminous particulate material, particular significance is attributed to the seeded processing pathway, as not only does seeded processing to form seeded particulate material allow for tightly controlled morphology of the precursor (which is largely preserved in the final product), but also the seeded processing route is believed to manifest desirable physical properties in the final product, including compositional, morphological, and crystalline distinctions over particulate material formed by conventional, non-seeded processing pathways.

According to embodiments described herein, a relatively powerful and flexible process methodology may be employed to engineer desired morphologies into the final boehmite product. Of particular significance, embodiments utilize seeded processing resulting in a cost-effective processing route with a high degree of process control which may result in desired fine average particle sizes as well as controlled particle size distributions. The combination of (i) identifying and controlling key variables in the process methodology, such as weight ratio, acid and base species and temperature, and (ii) seeding-based technology is of particular significance, providing repeatable and controllable processing of desired boehmite particulate material morphologies.

Figure 2:
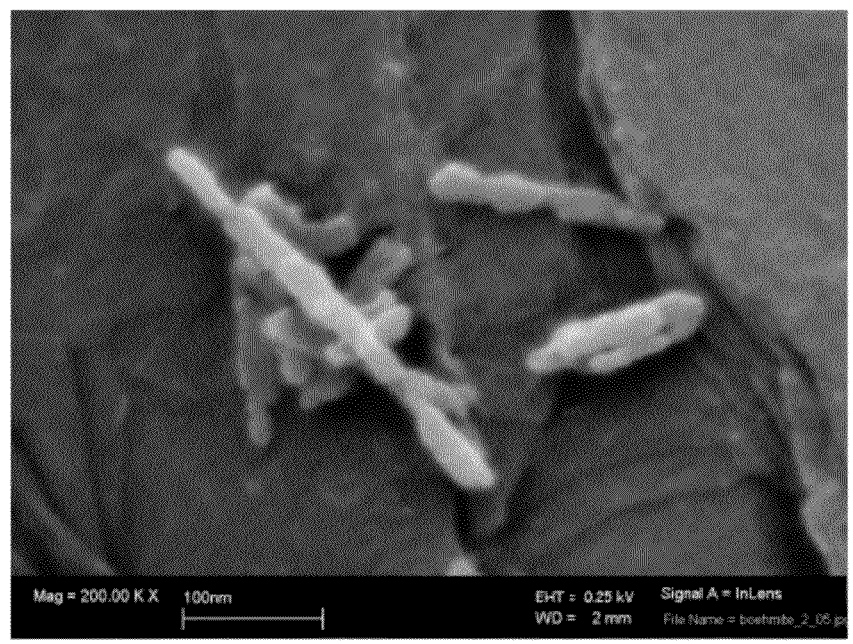
FIG. 2 is an illustrative image of exemplary needle shaped particles.
Figure 3:
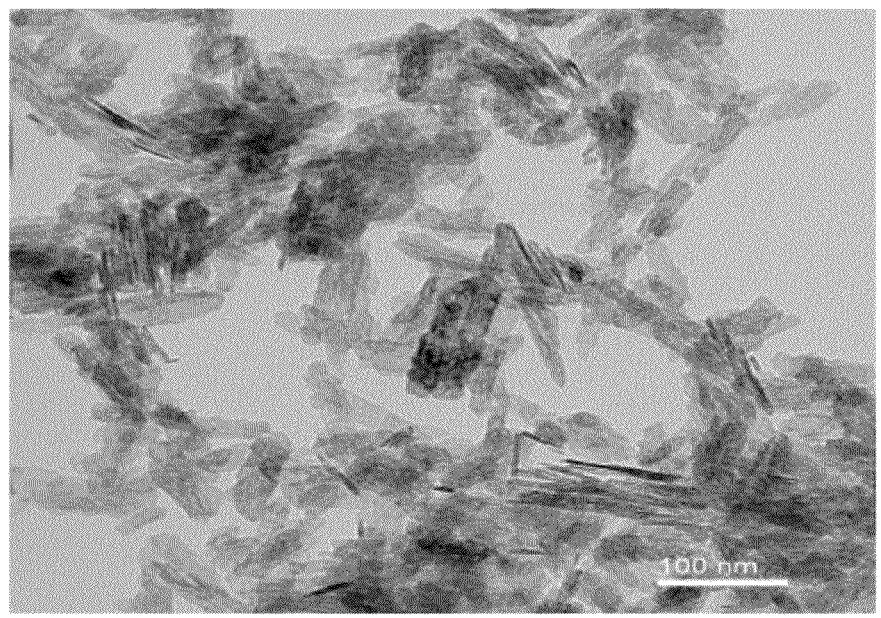
FIG. 3 is an illustrative image of exemplary needle shaped particles having nodular structure.

Additional characterization studies were carried out to more precisely understand the effect of seeding on particle morphology. FIG. 1 illustrates the platelet shapes particles as discussed above. FIG. 2 illustrates needle shaped particles as discussed above. FIG. 2 reveals that the seeded particles have a nodular structure, in that the particles are 'bumpy' or 'knotty' and have a generally rough outer texture. Further characterization was carried out by TEM analysis to discover that what appears by SEM to be generally monolithic particles, the particles are actually formed of tight, dense assemblies of platelet particles as shown in FIG. 3. The particles have a controlled aggregate morphology, in that the aggregates display a level of uniformity beyond conventional aggregate technologies. It is understood that the controlled aggregate structures form the nodular structure, and are unique to the seeded approach discussed above.

Figure 4:
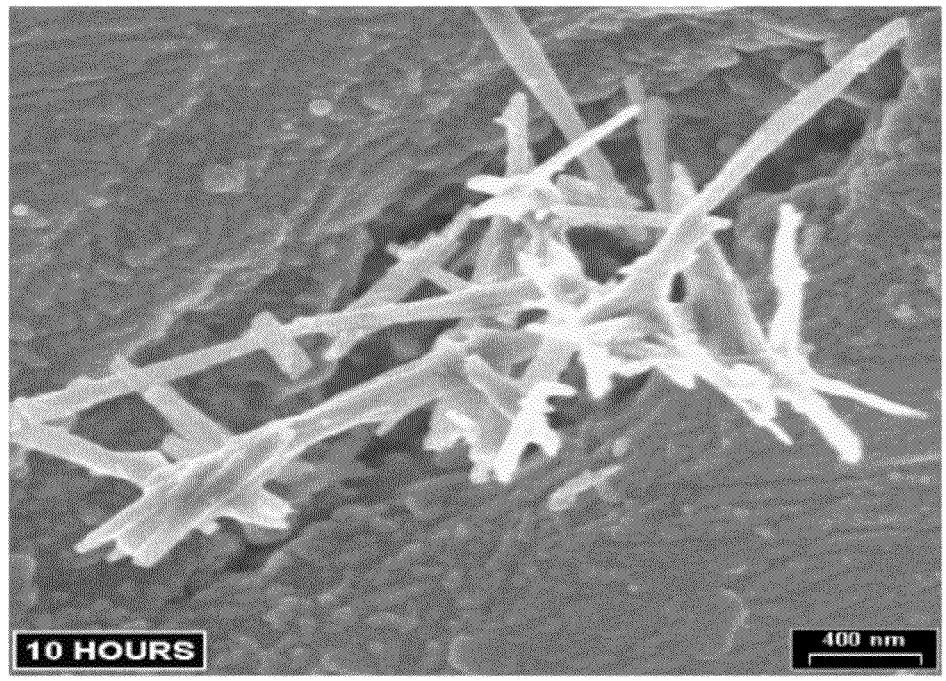
FIG. 4 is an illustrative image of prior art smooth hair-like particles.

It is recognized that non-seeded approaches have been found to form particulate material, including approaches that decompose raw materials through consumption of an aluminum salt, such as aluminum nitrate or aluminum sulfate. However, these metal salt decomposition approaches form morphologically distinct particulates that are devoid of the seeded morphology, notably lacking the nodular structure. FIG. 4 is representative of such materials, showing non-seeded morphology that has a smooth or hair-like outer surface texture. Examples of such non-seeded approaches include those disclosed in U.S. Pat. No. 3,108,888 and U.S. Pat. No. 2,915,475, and thesis paper Preparation and Characterization of Acicular Particles and Thin Films of Aluminum Oxide, by Raymond M. Brusasco, May 1987. The material shown in FIG. 4 was formed the process disclosed in JP2003-054941.

In an exemplary embodiment, the aluminous sol forms alumina particulate. The alumina particulate may include a seeded alumina hydrate particulate. In general, the alumina hydrate particulate material includes hydrated alumina conforming to the formula: $Al(OH)_aO_b$, where $0<a\leq3$, such as $1\leq a\leq2$, and $b=(3-a)/2$. In an example, the alumina hydrate particulate material has a positive surface charge. The alumina hydrate particulate material has a water content of about 1% to about 38% by weight, such as about 15% to about 38% water content by weight.

Alumina hydrate particulate materials can include aluminum hydroxides, such as ATH (aluminum tri-hydroxide), in mineral forms known commonly as gibbsite, bayerite, or bauxite, or can include alumina monohydrate, also referred to as boehmite. Such mineral form aluminum hydroxides can form alumina hydrate particulate material useful in forming a catalyst support.

According to an embodiment, the particles have a primary aspect ratio, defined as the ratio of the longest dimension to the next longest dimension perpendicular to the longest dimension. In an embodiment, the longest dimension and the second longest dimension may be substantially similar and the primary aspect ratio may be about 1:1. In an alternative embodiment, the longest dimension and the second longest dimension may be different and the primary aspect ratio may be generally at least about 1.5:1, such as at least about 2:1, and, in particular, at least about 3:1, such as at least about 4:1, or at least about 6:1. Particular embodiments have relatively elongated particles, having primary aspect ratios such as at least about 8:1, at least about 10:1, and, in particular examples, at least about 14:1.

With particular reference to the morphologies of the particles, different morphologies are available, such as needle-shaped particles, platelet-shaped particles, and clusters of platelet-shaped particles. For example, particles having a needle-shaped morphology may be further characterized with reference to a secondary aspect ratio defined as the ratio of the second longest dimension to the third longest dimension perpendicular to the first and second longest dimensions. The secondary aspect ratio of a needle-shaped particle is generally not greater than about 3:1, typically not greater than about 2:1, or not greater than about 1.5:1, and oftentimes about 1:1. For a needle-shaped particle, the secondary aspect ratio generally describes the cross-sectional geometry of the particles in a plane perpendicular to the longest dimension. It is noted that since the term aspect ratio is used herein to denote the ratio of the longest dimension to the next longest dimension, it may be referred as the primary aspect ratio.

According to another embodiment, the particle can be a platy or platelet-shaped particle generally of an elongated structure having a primary aspect ratio described above in connection with the needle-shaped particles. However, a platelet-shaped particle generally has opposite major surfaces, the opposite major surfaces being generally planar and generally parallel to each other. In addition, the platelet-shaped particle may be characterized as having a secondary aspect ratio greater than that of needle-shaped particles, generally at least about 3:1, such as at least about 6:1, or at least about 10:1. Typically, the shortest dimension or edge dimension, perpendicular to the opposite major surfaces or faces, is generally less than 50 nanometers, such as less than about 40 nanometers, or less than about 30 nanometers.

According to another embodiment, a cluster of platelet-shaped particles can generally form an elongated structure having a primary aspect ratio described above in connection with the needle-shaped particles. In addition, the ellipsoidal-shaped cluster may be characterized as having a secondary aspect ratio not greater than about 2:1, not greater than about 1.5:1, or about 1:1.

Individual particles may have an average longest particle dimension of not greater than about 2000 nm. For example, the average largest particle dimension may be not greater than about 1000 nm, such as not greater than about 500 nm. Due to process constraints of certain embodiments, the smallest average particle size is generally at least about 30 nm, such as at least about 50 nm, such as at least about 75 nm, such as at least about 100 nm, or at least about 135 nm. Additionally, individual particles may have an average shortest particle dimension not greater than about 50 nm. In particular, the average largest particle dimension may be in a range between about 50 nm to about 1000 nm, such as about 100 nm to about 1000 nm, or about 100 nm to about 250 nm.

Due to the non-spherical morphology of the particles, conventional characterization technology is generally inadequate to measure average particle size, since characterization technology is generally based upon an assumption that the particles are spherical or near-spherical. Accordingly, average particle size was determined by taking multiple representative samples and physically measuring the particle sizes found in representative samples. Such samples may be taken by various characterization techniques, such as by scanning electron microscopy (SEM). The term average particle size also denotes primary particle size, related to the individually identifiable particles, whether in dispersed or agglomerated forms. Of course, agglomerates have a comparatively larger average particle size.

In addition to aspect ratio and average particle size of the particulate material, morphology of the particulate material may be further characterized in terms of specific surface area. Herein, the $C_{BET}$ value and the specific surface area of the particulate material relates to specific surface area as measurable by the commonly available BET technique. In an exemplary embodiment, the $C_{BET}$ value of the unmodified alumina hydrate particulate material is at least about 120, such as at least about 150. According to embodiments herein, the particulate material has a specific surface area, generally at least about 10 $m^2/g$, such as at least about 20 $m^2/g$, at least about 30 $m^2/g$, or at least about 40 $m^2/g$, or at least about 70 $m^2/g$. Since specific surface area is a function of particle morphology as well as particle size, generally the specific surface area of embodiments is not greater than about 250 $m^2/g$, such as not greater than about 200 $m^2/g$ or not greater than about 90 $m^2/g$. In particular, the surface area may be about 50 $m^2/g$ to 250 $m^2/g$. In an exemplary embodiment, needle shaped alumina hydrate particulate has a specific surface area of at least about 40 $m^2/g$, generally at least about 100 $m^2/g$, such as at least about 200 $m^2/g$. In another exemplary embodiment, needle shaped alumina hydrate particulate has a specific surface area of not greater than about 250 $m^2/g$. In another exemplary embodiment, platelet shaped alumina hydrate particulate has a specific surface area about 50 $m^2/g$ to about 98 $m^2/g$.

In a particular embodiment, the alumina hydrate particulate may be aggregated resulting in particle agglomerates of alumina hydrate. For example, the particle agglomerates may have a size of at least about 60 microns, such as at least about 100 microns, particularly at least about 150 microns. The particle agglomerates of alumina hydrate can be characterized by pore volume, pore size, and specific surface area (SSA). Pore volume, pore size, and specific surface area can be measure using Hg porosimetry or BET methods.

The Hg porosimetry is measured in accordance to DIN 66 133. Hg porosimetry results may be used to determine an Hg Pore Volume and the Hg Pore Size. The Hg Pore Volume (cc/g) is the total volume of the pores, as determined by Hg porosimetry, less than about 10 microns. The Hg Pore Size (nm) is the median pore size, as determined by Hg porosimetry, of pores less than about 10 microns. In an exemplary embodiment, the Hg Pore Volume of the particle agglomerates may be generally as at least about 0.5 cc/g, preferably at least about 0.6 cc/g, such as at least about 0.7 cc/g. Additionally, the Hg Pore Size of the particle agglomerates is generally at least about 10.0 nm, and in particular at least about 15.0 nm, such as at least about 20.0 nm.

BET pore volume may be determined according to ISO 5794. BET pore volume results may be used to determine a BET Pore Volume, BET Pore Size, and BET Specific Surface Area. The BET Pore Volume is the total volume of the pores less than about 1 microns. The BET Pore Size is the median pore size of pores less than about 1 microns. The BET Specific Surface Area ($m^2/g$) is the surface area, as determined by BET porosimetry. The BET Pore Volume of the particle agglomerate may be generally at least about 0.2 cc/g, such as at least about 0.3 cc/g, such as at least about 0.5 cc/g, and in particular at least about 0.65 cc/g, such as at least about 0.7 cc/g. Additionally, the BET Pore Size of the particle agglomerates is generally at least about 10.0 nm, and in particular at least about 15.0 nm, such as at least about 20.0 nm. Further, the BET Specific Surface Area of the particle agglomerates is generally at least about 100 $m^2/g$, and in particular at least about 150 $m^2/g$, such as at least about 200 $m^2/g$.

EXAMPLES

Example 1

A commercially available alumina hydrate particulate was combined with a SiC. The mixture was treated in an autoclave, dried, crushed, and calcined. The samples are tested for Specific Surface Area, BET Pore Volume, and BET Pore Size. The results are shown in Table 1.

For example, Sample 1, a solution of seeded alumina hydrate particulate (CAM9010 available from Saint-Gobain Ceramics and Plastics Corporation) is adjusted to a pH of 3 and a % solids of 15%. The solution is processed in an autoclave, dried, and crushed. The aggregates are calcined at a temperature of 900° C.

Sample 2 is prepared as Sample 1, except the aggregates are calcined at a temperature of 1100° C.

Sample 3 is prepared as Sample 1, except the aggregates are calcined at a temperature of 1200° C.

Sample 4, is a mixture of CAM9010 and SiC. A solution of seeded alumina hydrate particulate (CAM9010 available from Saint-Gobain Ceramics and Plastics Corporation) is adjusted to a pH of 3 and a % solids of 15%. A solution of SiC is adjusted to a pH of 7 and a % solids of 11%. The solutions are combined to achieve an alumina hydrate:SiC ratio of 75:25 and a % solids of 14%. The pH of the resulting solution is 3.12. The mixture is processed in an autoclave, dried, and crushed. The aggregates are calcined at a temperature of 900° C.

Sample 5 is prepared as Sample 5, except the aggregates are calcined at a temperature of 1100° C.

Sample 6 is prepared as Sample 5, except the aggregates are calcined at a temperature of 1200° C.

TABLE 1

|  | SSA | BET Pore Volume |
| --- | --- | --- |
| Sample 1 | 105 | 0.54 |
| Sample 2 | 60 | 0.44 |
| Sample 3 | 26 | 0.13 |
| Sample 4 | 132 | 0.65 |
| Sample 5 | 91 | 0.51 |
| Sample 6 | 85 | 0.45 |

While the invention has been illustrated and described in the context of specific embodiments, it is not intended to be limited to the details shown, since various modifications and substitutions can be made without departing in any way from the scope of the present invention. For example, additional or equivalent substitutes can be provided and additional or equivalent production steps can be employed. As such, further modifications and equivalents of the invention herein disclosed may occur to persons skilled in the art using no more than routine experimentation, and all such modifications and equivalents are believed to be within the scope of the invention as defined by the following claims.

What is claimed is:

1. A method of forming a porous aluminous material comprising:
    coating a pore modifying agent with a toughening agent to form a coated pore modifying agent;
    mixing an aluminous sol and the coated pore modifying agent to form a mixture, the aluminous sol including aluminous particles having a primary aspect ratio of at least about 4.0 and a particle size between about 30 nm and about 1000 nm;
    drying the mixture to form an aggregated material; and
    heat treating the aggregated material to form a porous aluminous material.

2. The method of claim 1, wherein the pore modifying agent is walnut shell, polymer beads, hydroxyl ethyl cellulose, polyethylene glycol, ammonium carbonate, or combinations thereof and the toughening agent is a multivalent cation, or an oxide thereof, and is derived from an atom selected from the group consisting of Si, Mg, La, Ba, Zr, Al, Ti, and any combination thereof.

3. The method of claim 1, wherein the aluminous particles comply to the formula the formula $Al(OH)_aO_b$, where $0<a<3$ and $b=(3-a)/2$.

4. The method of claim 1, wherein heat treating includes sintering at a temperature of at least about 500° C.

5. A method of forming a porous aluminous material comprising:
    coating a pore modifying agent with a pinning agent to form a coated pore modifying agent;
    mixing an aluminous sol and the coated pore modifying agent to form a mixture, the aluminous sol including aluminous particles having a primary aspect ratio of at least about 3.0 and a particle size between about 30 nm and about 1000 nm;
    drying the mixture to form an aggregate material; and
    heat treating the aggregate material to from a porous aluminous material, at least a portion of the pore modifying agent being removed during heat treating.

6. The method of claim 5, wherein the pore modifying agent includes an organic material.

7. The method of claim 6, wherein the organic material includes a polymer.

8. The method of claim 7, wherein the pinning agent is selected from the group consisting of $TiO_2$, $SiO_2$, SiC, $ZrO_2$, YSZ, and any combination thereof.

9. The method of claim 7, wherein the pore modifying agent further includes a toughening agent.

10. The method of claim 9, wherein the toughening agent includes a multivalent cation or an oxide thereof.

11. The method of claim 10, wherein the multivalent cation is derived from an atom selected from the group consisting of Si, Mg, La, Ba, Zr, Al, Ti, and a combination thereof.

12. The method of claim 5, wherein heat treating includes firing at a temperature of at least about 500° C.

13. The method of claim 5, wherein the aluminous particles comply to the formula the formula $Al(OH)_aO_b$, where $0<a<3$ and $b=(3-a)/2$.

14. A method of forming a porous aluminous material comprising:
    coating a pore modifying agent with a pinning agent to form a coated pore modifying agent;
    mixing an aluminous sol and the coated pore modifying agent to form a mixture, the aluminous sol including aluminous particles having a primary aspect ratio of at least about 4.0 and a particle size between about 30 nm and about 1000 nm;
    drying the mixture to form an aggregated material; and
    heat treating the aggregate material to form a porous aluminous material.

15. The method of claim 14, wherein the pore modifying agent is walnut shell, polymer beads, hydroxyl ethyl cellulose, polyethylene glycol, ammonium carbonate, or combinations thereof and the pinning agent is selected from the group consisting of $ZrO_2$, $TiO_2$, SiC, CaO, CoO, NiO, ZnO, MnO, CuO, SrO, BaO, and any combination thereof.

16. The method of claim 14, wherein heat treating includes sintering at a temperature at least about 500° C.

17. A method of forming a porous aluminous material comprising:
    mixing an aluminous sol and a pore modifying agent to form a mixture, the aluminous sol including aluminous particles having a primary aspect ratio of at least about 3.0 and a particle size between about 30 nm and about 1000 nm;

drying the mixture to form an aggregate material; and
heat treating the aggregate material to from a porous aluminous material, at least a portion of the pore modifying agent being removed during heat treating,
wherein the pore modifying agent is walnut shell, polymer beads, hydroxyl ethyl cellulose, polyethylene glycol, ammonium carbonate, or combinations thereof and is coated with $TiO_2$, $SiO_2$, SiC, $ZrO_2$, yttria stabilized zirconia (YSZ), or combinations thereof.

18. The method of claim 17, wherein the pore modifying agent is polymer beads coated with SiC.

* * * * *